United States Patent
Zittel et al.

(10) Patent No.: US 7,694,893 B2
(45) Date of Patent: Apr. 13, 2010

(54) PLURAL COMPONENT SPRAY GUN FOR FAST SETTING MATERIALS

(75) Inventors: Douglas P. Zittel, Brooklyn Park, MN (US); Michael J. Sebion, Apple Valley, MN (US); Richard D. Anderson, Maple Grove, MN (US); Peter L. Linder, North Branch, MN (US); Christopher J. Pellin, Burnsville, MN (US); Mark T. Weinberger, Mounds View, MN (US); Mark C. Richler, River Falls, WI (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 10/532,436

(22) PCT Filed: Oct. 22, 2003

(86) PCT No.: PCT/US03/33422

§ 371 (c)(1),
(2), (4) Date: Aug. 9, 2006

(87) PCT Pub. No.: WO2004/037429

PCT Pub. Date: May 6, 2004

(65) Prior Publication Data

US 2007/0034716 A1    Feb. 15, 2007

Related U.S. Application Data

(60) Provisional application No. 60/420,085, filed on Oct. 22, 2002, provisional application No. 60/441,575, filed on Jan. 21, 2003, provisional application No. 60/462,124, filed on Apr. 10, 2003.

(51) Int. Cl.
*B05B 15/02* (2006.01)
*F23D 11/34* (2006.01)
*F23D 14/50* (2006.01)

(52) U.S. Cl. ............... 239/117; 239/413; 239/415; 239/433; 239/600

(58) Field of Classification Search ............... 239/112, 239/117, 414, 413, 415, 290, 292; 222/145.5, 222/145.7, 145.2, 135
See application file for complete search history.

(56) References Cited

U.S. PATENT DOCUMENTS 2,335,116 A    11/1943  Hansen
2,780,496 A    2/1957   Asbeck et al.

(Continued)

FOREIGN PATENT DOCUMENTS

AT    349744    4/1979

(Continued)

*Primary Examiner*—Dinh Q Nguyen
(74) *Attorney, Agent, or Firm*—Douglas B. Farrow

(57) ABSTRACT

A plural component spray gun (1) is designed for spraying quick setting materials such as foams, polyurea and the like. Towards this end, the gun (1) is designed so as to be easily serviceable with a minimum of tools. For example, the side seal cartridges (18) and (20) may be installed and removed without tools by removing the retaining ring (9) and then extracting them from the fluid housing (11). Those cartridges (18) and (20) are easily disassembled and cleaned. Similarly, the fluid housing (11) may be removed from the handle/body (1) by unscrewing the lock ring (7) by hand.

11 Claims, 13 Drawing Sheets

U.S. PATENT DOCUMENTS

| | | | |
|---|---|---|---|
| 2,970,773 A * | 2/1961 | Keryluk et al. | 239/142 |
| 3,053,457 A | 9/1962 | Trumbull et al. | |
| 3,111,271 A | 11/1963 | Lofgren | |
| 3,144,210 A * | 8/1964 | Levy | 239/415 |
| 3,541,023 A | 11/1970 | Cole, III | |
| 3,687,370 A | 8/1972 | Sperry | |
| 3,799,403 A | 3/1974 | Probst et al. | |
| 3,920,188 A | 11/1975 | Price | |
| 4,202,497 A * | 5/1980 | Ten Pas | 239/112 |
| 4,377,256 A * | 3/1983 | Commette et al. | 239/117 |
| 4,427,153 A * | 1/1984 | Schaefer | 239/117 |
| 4,471,887 A * | 9/1984 | Decker | 222/135 |
| 4,501,394 A | 2/1985 | Kwok | |
| 4,760,956 A | 8/1988 | Mansfield | |
| 4,838,458 A | 6/1989 | Davidson | |
| 5,211,311 A | 5/1993 | Petcen | |
| 5,299,740 A * | 4/1994 | Bert | 239/117 |
| 5,452,855 A * | 9/1995 | Keller | 239/135 |
| 6,264,113 B1 | 7/2001 | Dingler | |

FOREIGN PATENT DOCUMENTS

| | | |
|---|---|---|
| CH | 401010 | 10/1965 |
| EP | 0204577 | 12/1986 |

\* cited by examiner

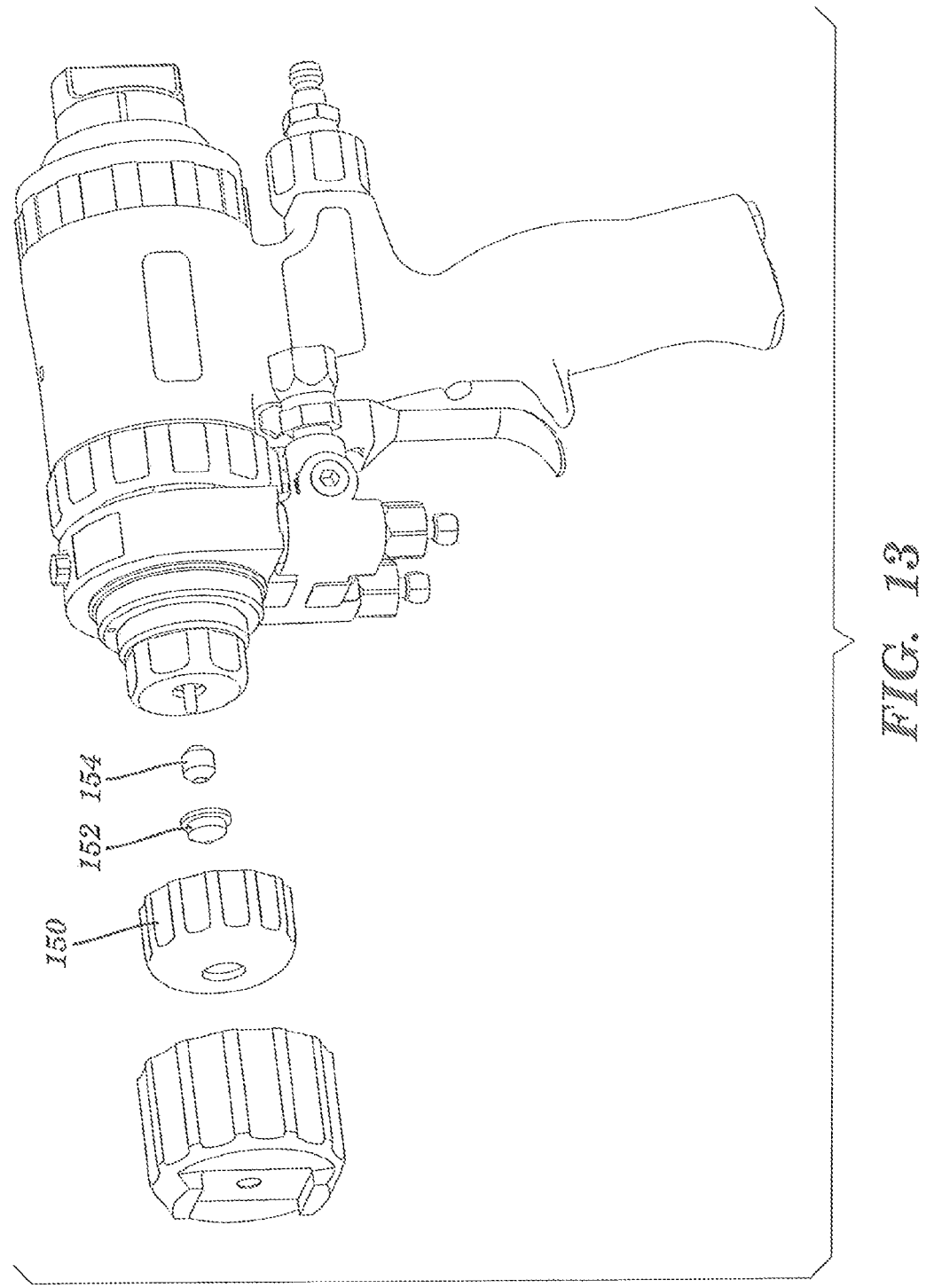

PLURAL COMPONENT SPRAY GUN FOR FAST SETTING MATERIALS

TECHNICAL FIELD

This application claims the benefit of U.S. application Ser. Nos. 60/420,085, filed Oct. 22, 2002, 60/441,575 filed Jan. 21, 2003 and 60/462,124 filed Apr. 10, 2003.

BACKGROUND ART

Plural component spray guns for use with fast setting materials have been popular for applying foams and similar materials. While such application devices are generally effective in applying such materials, they are often cumbersome and can require a number of tools and substantial effort to disassemble and clean.

DISCLOSURE OF THE INVENTION

A plural component spray gun is designed for spraying quick setting materials such as foams and the like. Towards this end, the air purge version of the gun is designed so as to be easily serviceable with a minimum of tools. For example, the side seal cartridges may be installed and removed without tools by removing the retaining ring and then extracting them from the fluid housing using a coin or screwdriver. The cartridges are easily disassembled and cleaned.

Similarly, the fluid housing may be removed from the handle by unscrewing the lock ring (by hand). Grease may be directly injected into the gun for storage without disassembly and is spread though the mix chamber by the purge air. The mixing chamber and piston are easily separated using an ⅛ turn connection. Line of sight air passages in the body are easy to machine and allow easier service in the field if plugged.

Impingement hole cleaning may be accomplished without exposing the fluid to air. The sealing surfaces of the side seal cartridge assemblies and the corresponding surfaces of the mix chamber are made of a hardened metal material such 440C stainless steel providing a metal-to-metal seal yielding excellent durability.

In a mechanical purge version of the gun, The air cap is provided with a pair of horns spaced so as to correspond with the dimension of the flats on the impingement chamber retainer to allow the retainer to be removed and installed without the use of a separate tool.

Typical prior art mechanical purge guns have two sets of fluid seals to seal the valving rod. The main seal, usually an interference fit, is Delrin A-F and is not adjustable. The front seal is also an interference fit and made from UHMWPE and also not adjustable. When the main seal wears the gun will "spit" fluid out the front of the gun, plugging the tip. The seals typically wear at similar rates, so when the gun spits, the users replaces both seals.

The impingement chamber forms first and second spaced annular chambers about the periphery thereof and first and second sets of passages connect said chambers with the interior passage thereof. The first and second sets of passages enter the interior passage at the same axial location thereby preventing a lead-lag situation which can produce unmixed material.

An easily adjustment mechanism for the purge rod is provided. The simple adjustment may be accomplished by turning the purge rod at the rear of the gun using a nut driver or similar tool. The purge rod is threadedly engaged in the piston while the piston is prevented from rotating relative to the gun body by means of complementary flats in the bore and on the piston.

These and other objects and advantages of the invention will appear more fully from the following description made in conjunction with the accompanying drawings wherein like reference characters refer to the same or similar parts throughout the several views.

BRIEF DESCRIPTION OF DRAWINGS

FIG. 13 is a partially exploded perspective view of the packing arrangement.

BEST MODE FOR CARRYING OUT THE INVENTION

Figure 1:
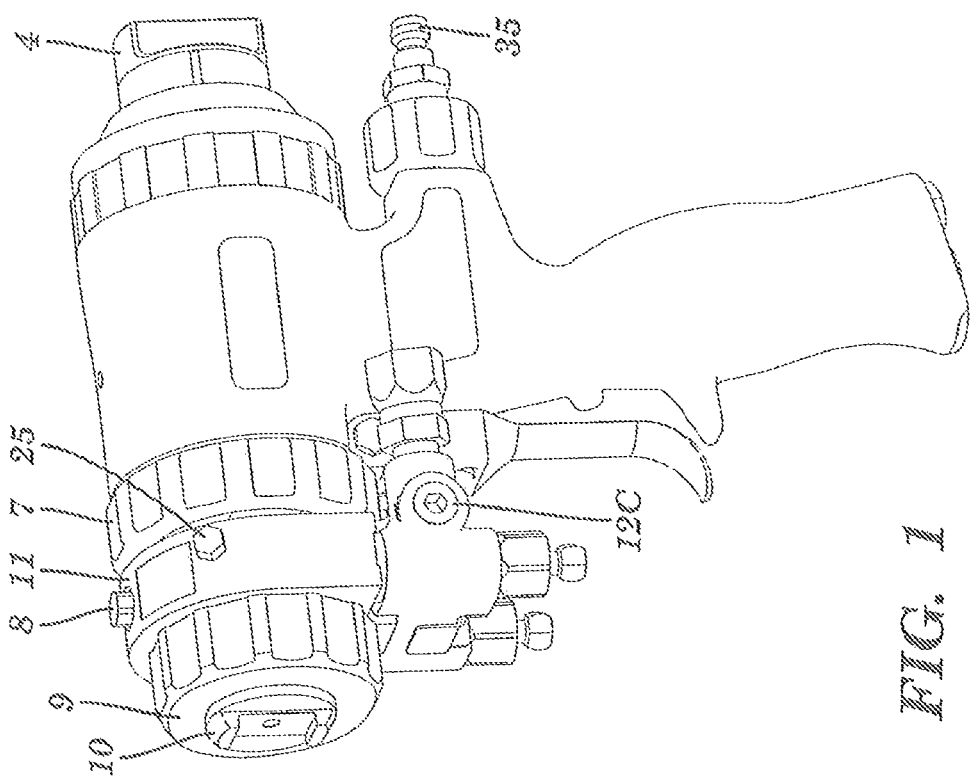
FIG. 1 is a perspective view of air purge embodiment of the instant invention.
Figure 2:
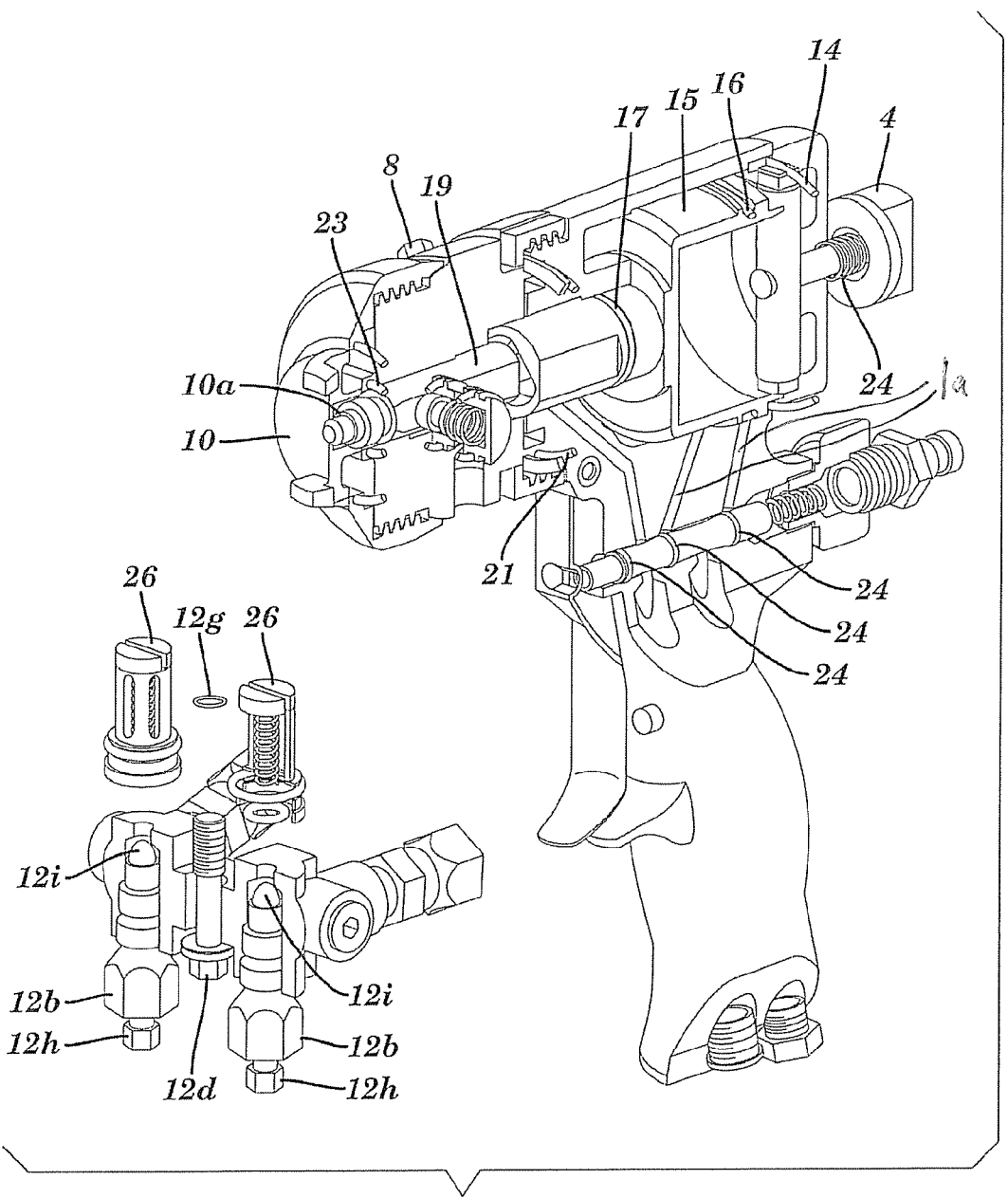
FIG. 2 is a partially cutaway view of the instant invention from the same angle as FIG. 1.
Figure 3:
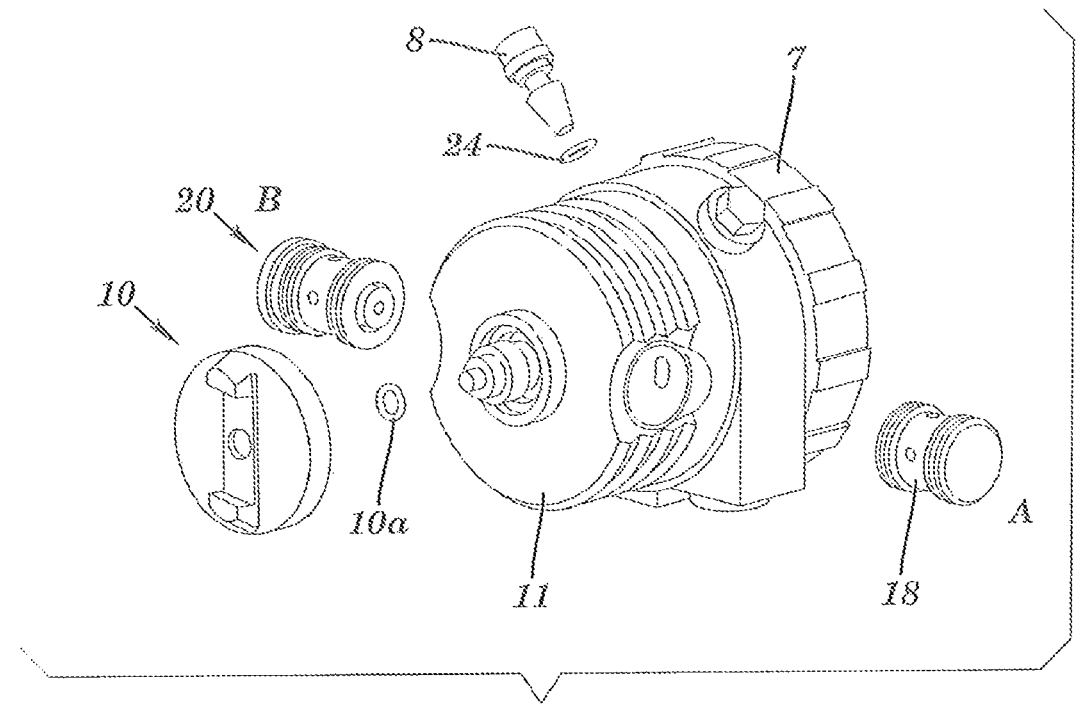
FIG. 3 shows a partially exploded view of the front of the instant invention.
Figure 4:
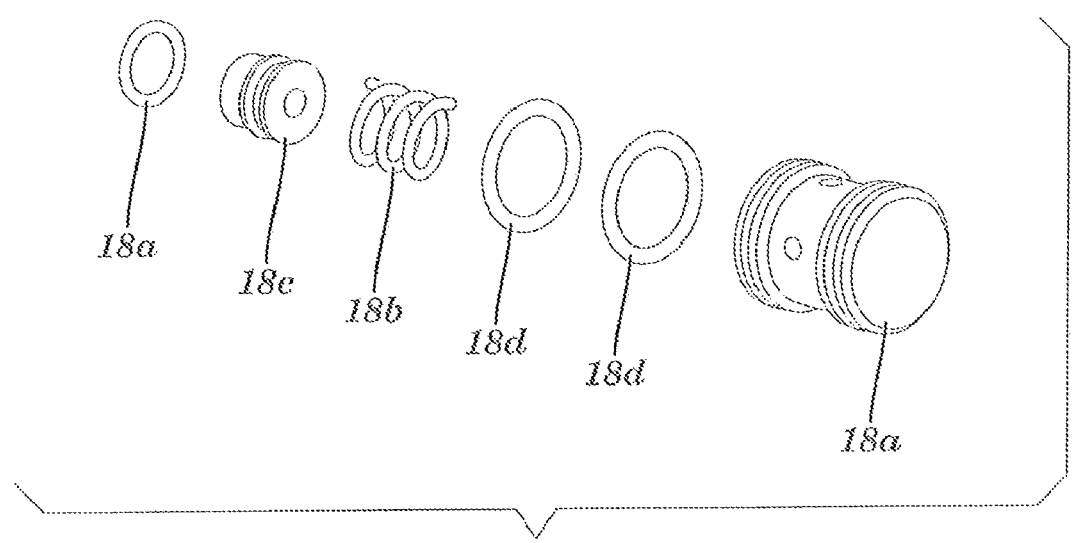
FIG. 4 shows an exploded view of the side seal cartridge of the instant invention.
Figure 5:
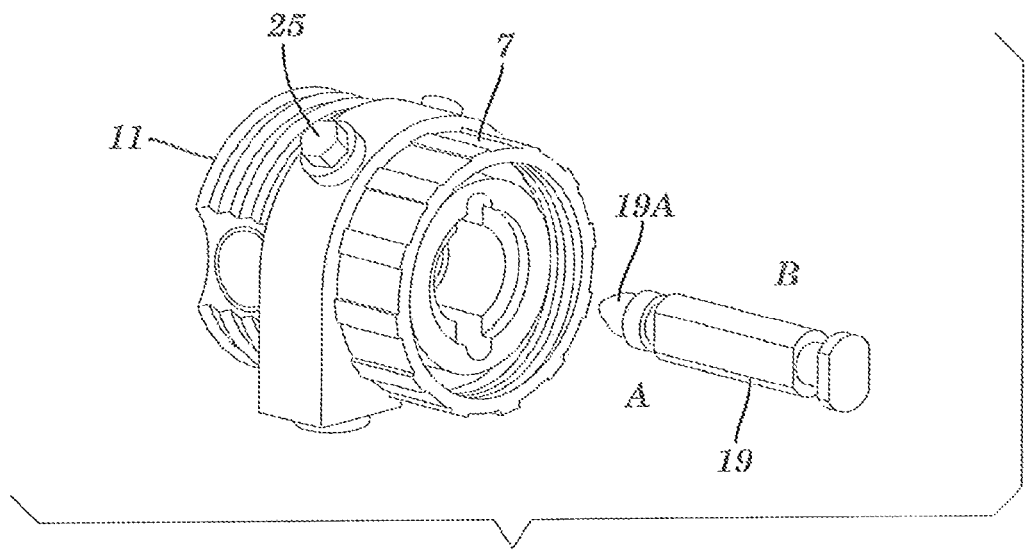
FIG. 5 shows assembly of the mix chamber to the fluid housing.
Figure 6:
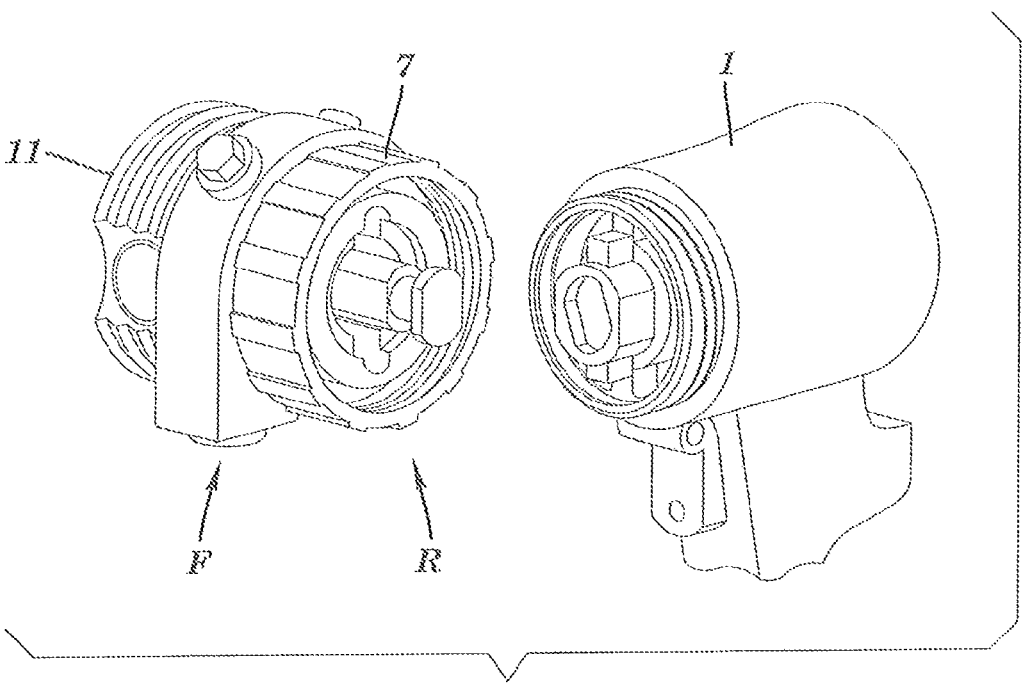
FIG. 6 shows removal of the fluid housing from the gun body.
Figure 7:
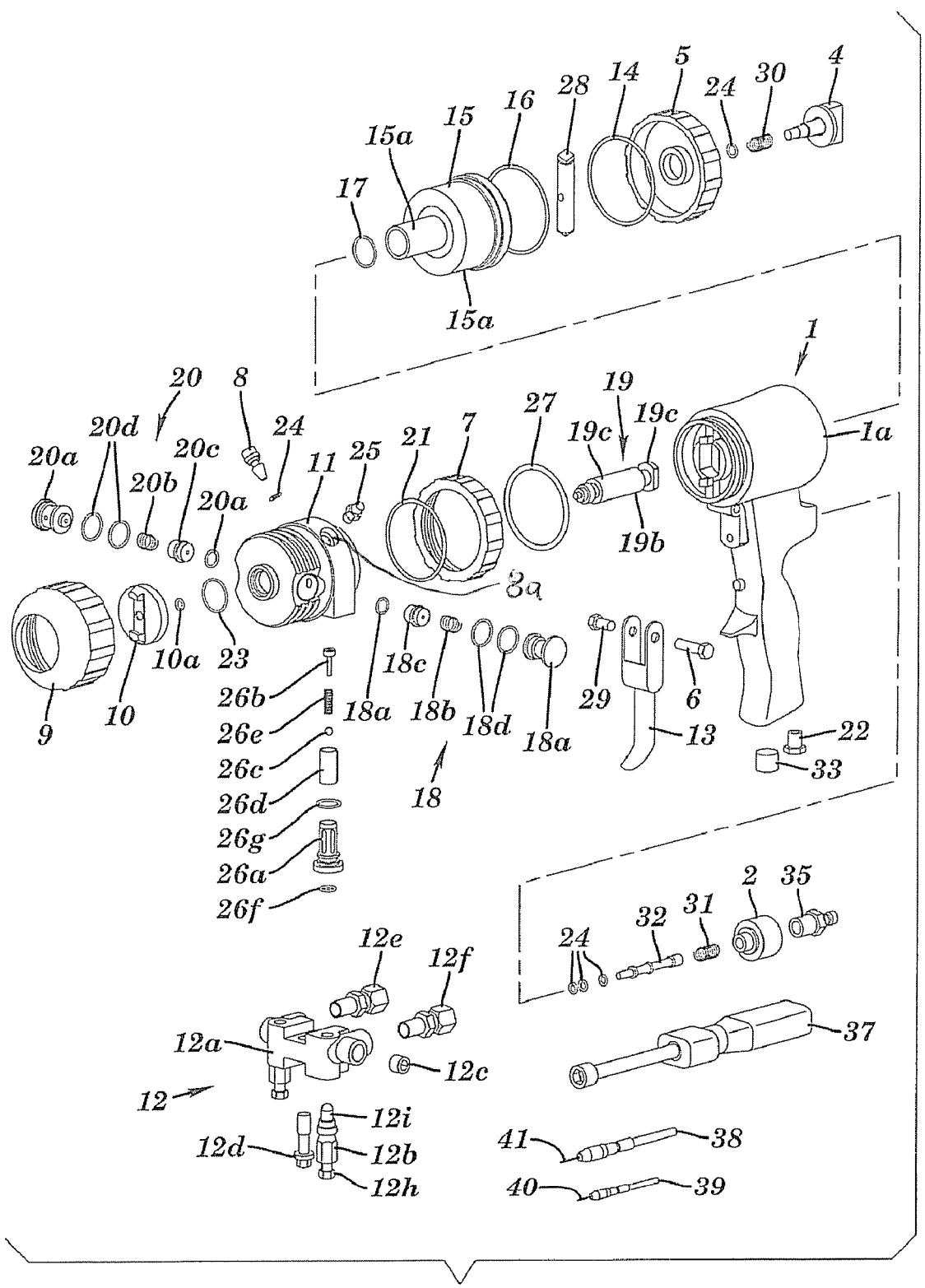
FIG. 7 shows an exploded view of the instant invention.
Figure 8:
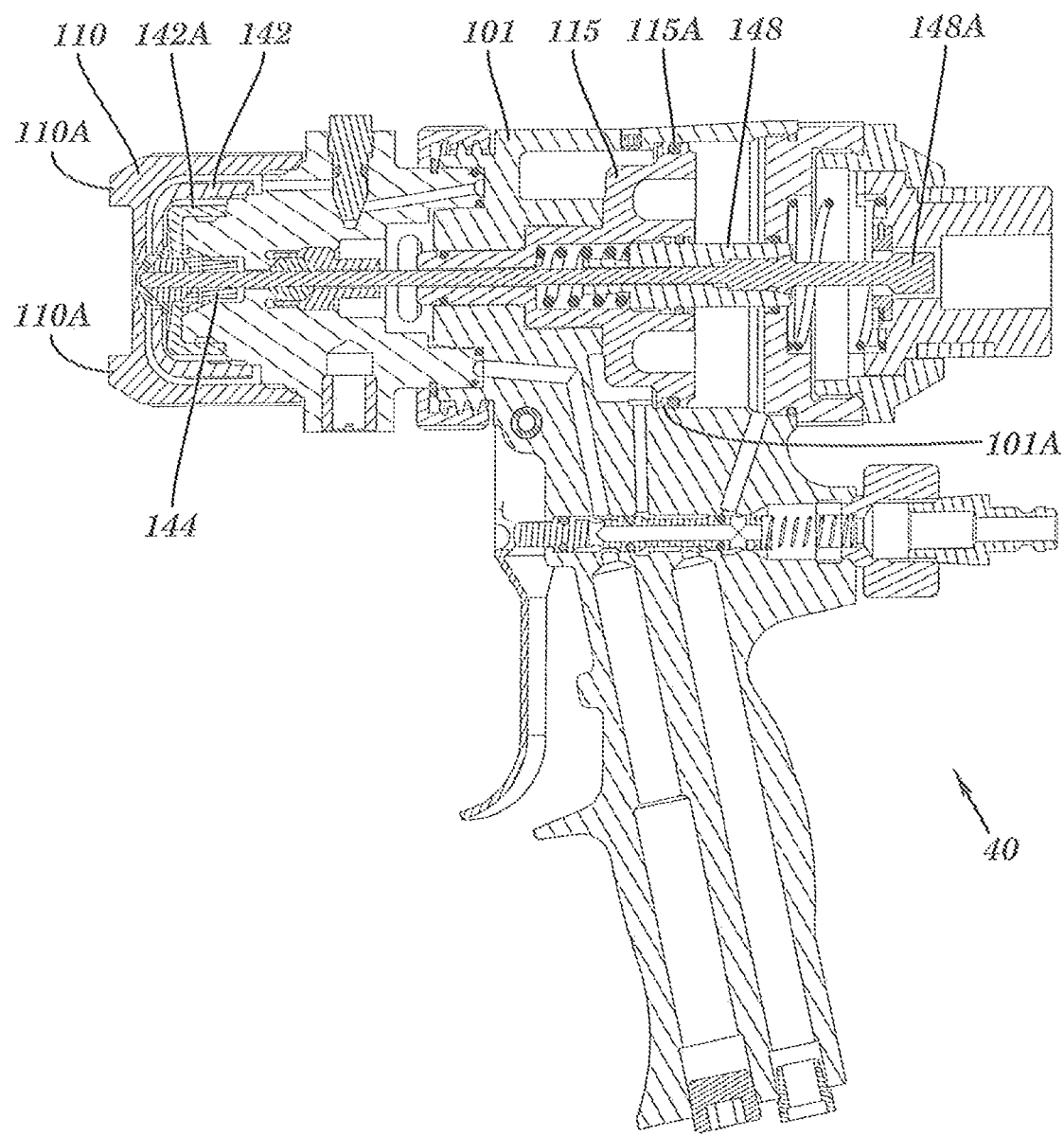
FIG. 8 shows a cross section of a mechanical purge embodiment of the instant invention.
Figure 9:
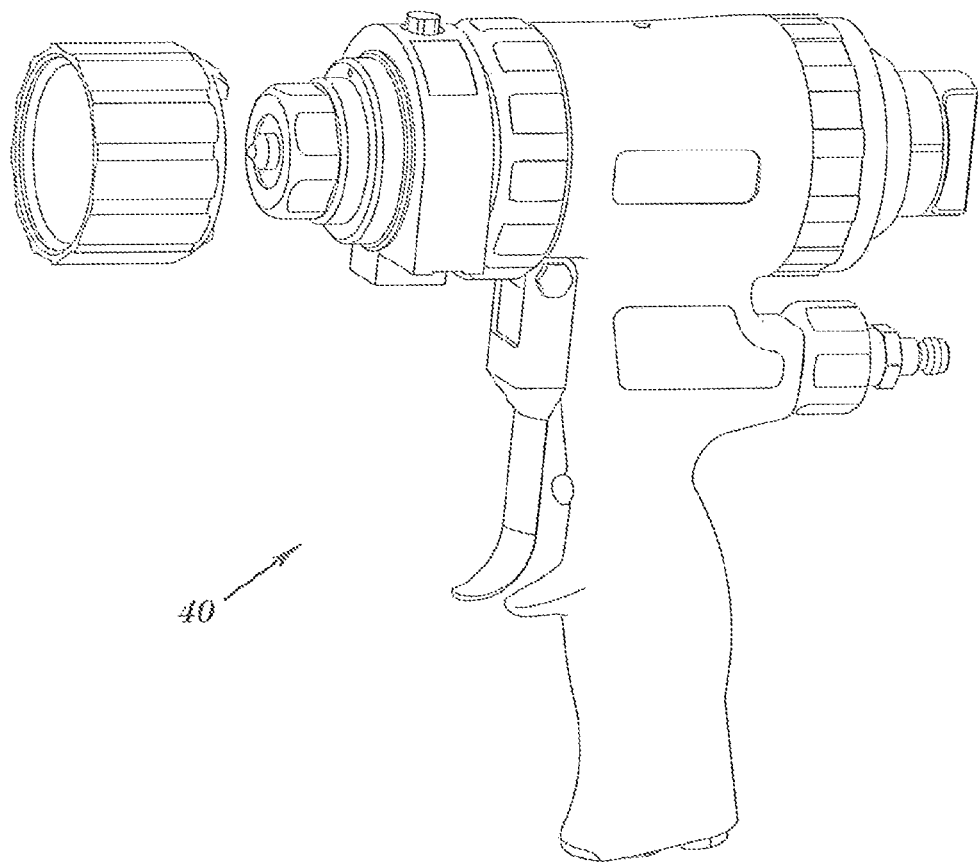
FIG. 9 shows a front perspective view of the mechanical purge embodiment of FIG. 8 showing the air cap reversed for impingement chamber retainer removal.
Figure 11:
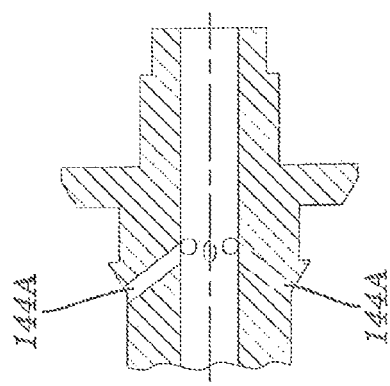
FIG. 11 is a section view taken along line 11—11 of FIG. 10.
Figure 12:
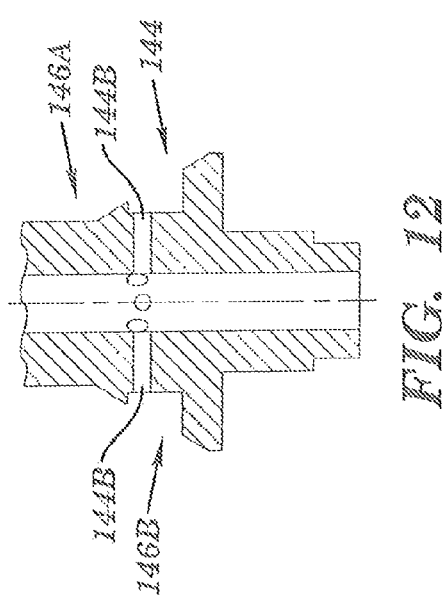
FIG. 12 is a section view taken along line 12—12 of FIG. 10.
Figure 10:
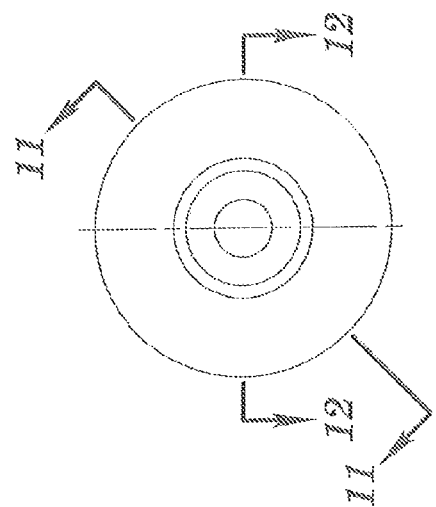
FIG. 10 is a front view of the impingement chamber of the mechanical purge embodiment of FIG. 8.
Figure 14:
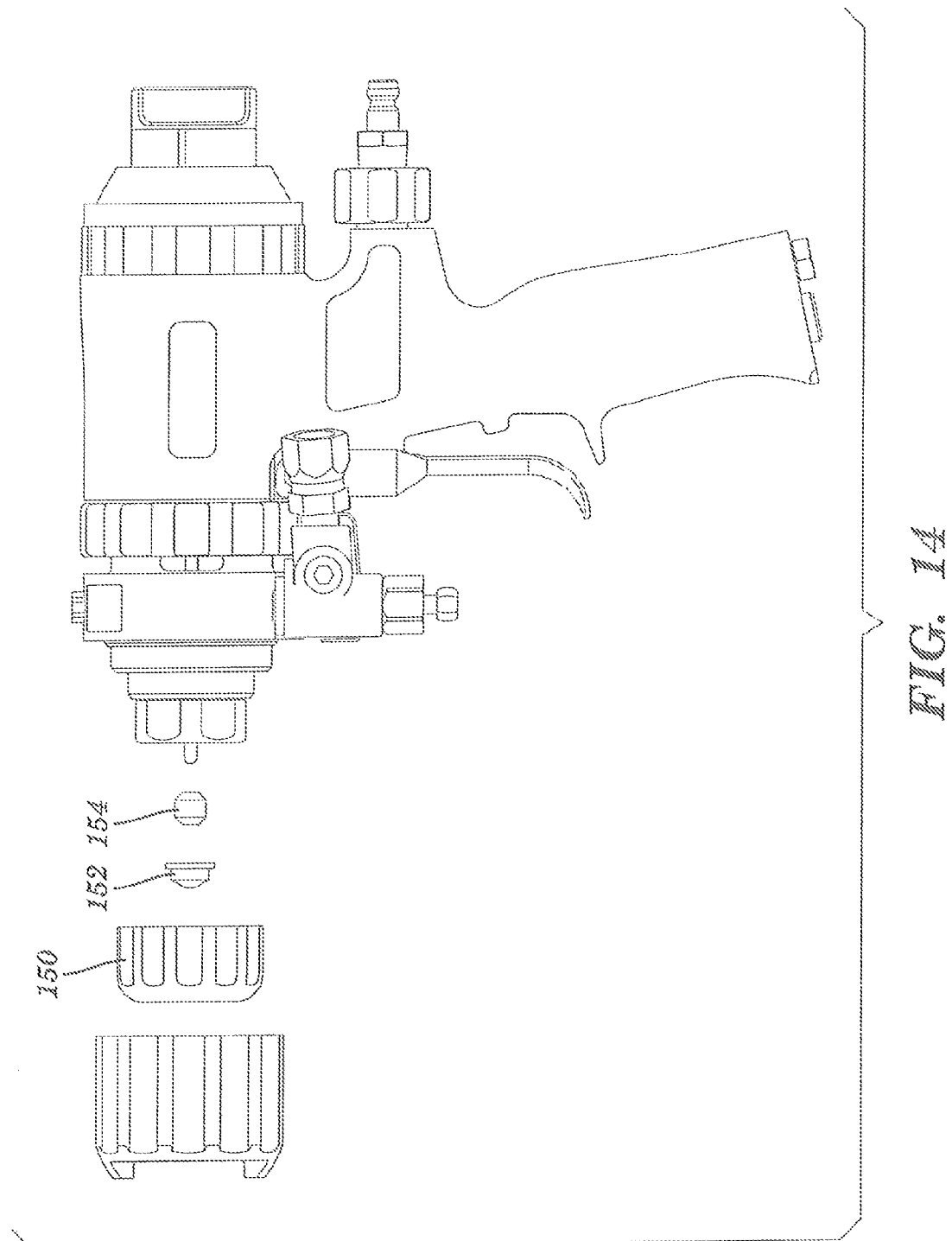
FIG. 14 is a partially exploded side view of the packing arrangement.

The air purge spray gun of the instant invention, generally designated 100, is shown in whole in FIGS. 1, 2 and 7. Gun 100 is comprised of a gun body 1. As can be seen in FIG. 2, air passages 1a are all manufactured in the line of sight for ease of machining and maintenance. When the piston 15 is removed, the whole length of each of the passages may be viewed and easily cleaned using a drill bit.

A releasable piston stop 28 is provided and may be actuated (via a push and turn) using safety lock 4. O-ring 24 and spring 30 are located therebetween. A rear cylinder cap 5 threads onto the rear of gun body 1 and is sealed by o-ring 14. One piece piston 15 slides on the interior 1c of gun body 1 (which have complementary flats 15a and 1b to prevent relative rotation) and has a projecting shaft 15a Sealing o-rings 16 and 17 are provided.

Mixing chamber 19 has two impingement holes 19a located diametrically opposite one another. Mixing chamber 19 also has two flattened sides which maintain the angular orientation relative to the fluid housing 11. Mixing chamber 19 also has a connecting flange 19c at the rear end thereof for ⅛ turn push and turn engagement (similar to a bayonet joint) with piston projecting shaft 15a. Side seal cartridge assemblies 18 and 20 are engaged and retained in fluid housing 11 by a combination of the friction fit of o-rings 20d and radial retention by retaining ring 9.

Retaining ring 9 also retains air cap 10 which screws to the front of mix chamber 19. Lock ring 7 is retained to the rear end of fluid housing 11 by ring 27. Sealing is provided by seals 10a, 23 and 21. This fluid chamber attachment arrangement allows the fluid section to be removed from the body without exposing either of the resin or iso (isocyanate) fluids to atmosphere which would lead to crystallization of the iso.

Side seal cartridge assemblies 18 and 20 are comprised of cartridge housings 18a and 20a, springs 18b and 20b, seals 18c and 20c and o-rings 18d, 20d, 18e and 20e. The sealing surfaces of side seal cartridge assemblies 18 and 20 and the corresponding surfaces of mix chamber 19 are made of a hardened metal material such 440C stainless steel.

Fluid manifold assembly 12 is comprised of a manifold housing 12a, first and second fluid valves 12b, plugs 12c, bolt 12d and swivels 12e and 12f. First and second fluid valves 12b each are provided with a one piece stem 12h having a hex head with a seal 12i threaded onto the other end for releasably shutting off fluid flow of the material being controlled. Fluid manifold 12 attaches to fluid housing 11 via bolt 12d and sealing o-ring 12g.

Located on the two sides of fluid housing 11 are check valves 26, each check valve 26 being comprised of a housing 26a, a screw 26b, a carbide ball 26c, a screen 26d, a spring 26e and o-rings 26f and 26g. Note that fluid flows from the inside out through the screen so that fluid pressure cannot collapse the screen 26d as happens on prior art guns.

Trigger 13 is mounted to body 1 by pin 6 and screw 29. The rear of trigger 13 selectively (by operator operation) contacts spool type air valve 32 in body 1. Spool type air valve 32 is mounted with 3 o-rings 24, spring 31 and air valve plug 2 which is in turn backed by an air quick disconnect 35. O-rings 24 like all o-rings in the gun are solvent-resistant so that the whole gun (not just the fluid section) can be soaked in solvent for cleaning. A muffler 22 and plug 33 are also provided in the bottom of gun body 1. Air valve disconnect 35 and plug 33 may be exchanged in order to have air come in from the back or bottom as desired by the operator.

A grease zerk fitting 25 is supplied in the fluid housing and connects to the purge air passage 8a. This allows the fluid passages in the mix chamber 19 and the front end of the gun to be filled with grease (which mixes with the purge air to prevent setup and crystallization. Such injection will allow the spray gun to be stored overnight with having to be completely cleaned. Similarly, the air cap 10 serves to direct cleanoff air around the front of the tip 19a so as to prevent buildup thereon.

In a mechanical purge version of the gun 40, The air cap 110 is provided with a pair of horns 110A spaced so as to correspond with the dimension of the flats 142A on the impingement chamber retainer 142 to allow the retainer 142 to be removed and installed without the use of a separate tool.

The impingement chamber 144 forms first and second spaced annular chambers 146A and 146B about the periphery thereof and first and second sets of passages 144A and 144B respectively connect said annular chambers 146A and 146B with the interior passage 144C thereof. The first and second sets of passages 144A and 144B enter the interior passage 144C at the same axial location thereby preventing a lead-lag situation which can produce unmixed material. As can be seen, set 144A is axially angled and set 144B radial and normal to the axis to achieve this result.

An easily adjustment mechanism for the purge rod 148 is provided. The simple adjustment may be accomplished by turning the rear end 148A purge rod at the rear of the gun using a nut driver or similar tool. The one piece purge rod 148 is threadedly engaged in the piston 115 while the piston is 115 prevented from rotating relative to the gun body 101 by means of complementary flats in the bore and on the piston (101A and 115A respectively).

The adjustable packing 154 of the instant invention, held in place by the tip retainer 150 (which also retains tip 152), allows the user to snug-up the front seal to stop the spitting. This adjustability will allow users to at least finish out the day without changing the main packing.

Figure 15:
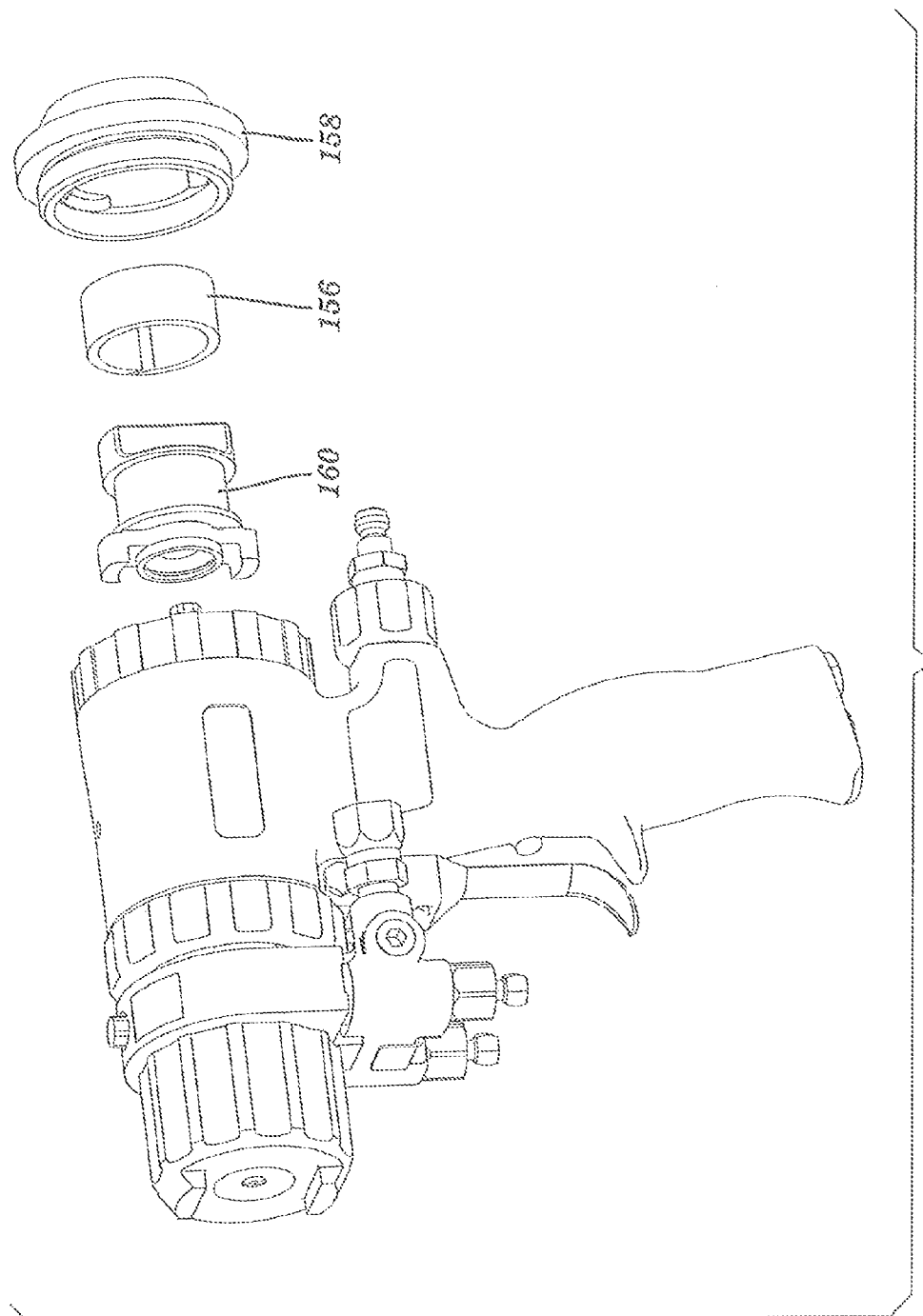
FIG. 15 is a partially exploded perspective view of the safety arrangement.
Figure 16:
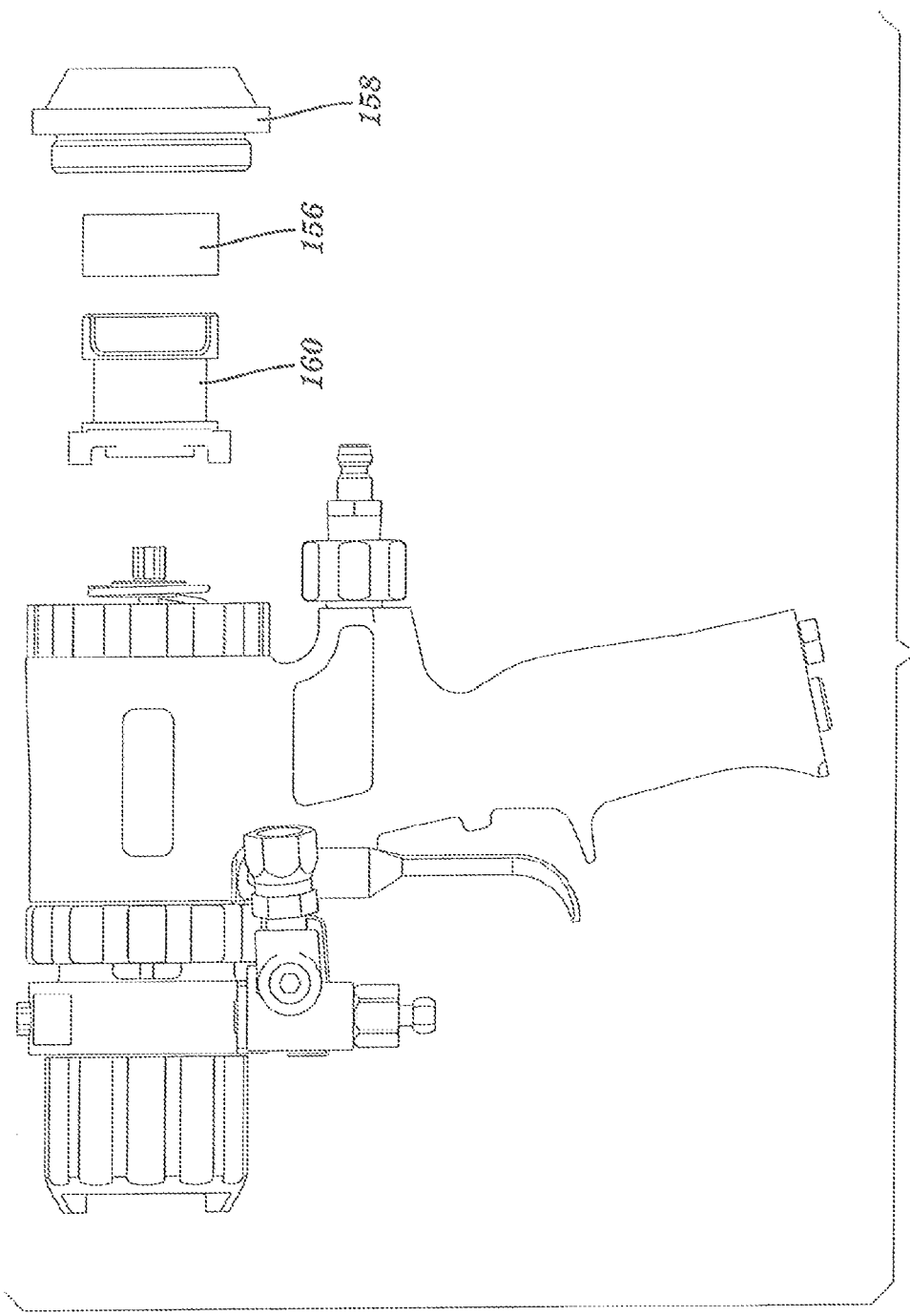
FIG. 16 is a partially exploded side view of the safety arrangement.
Figure 17:
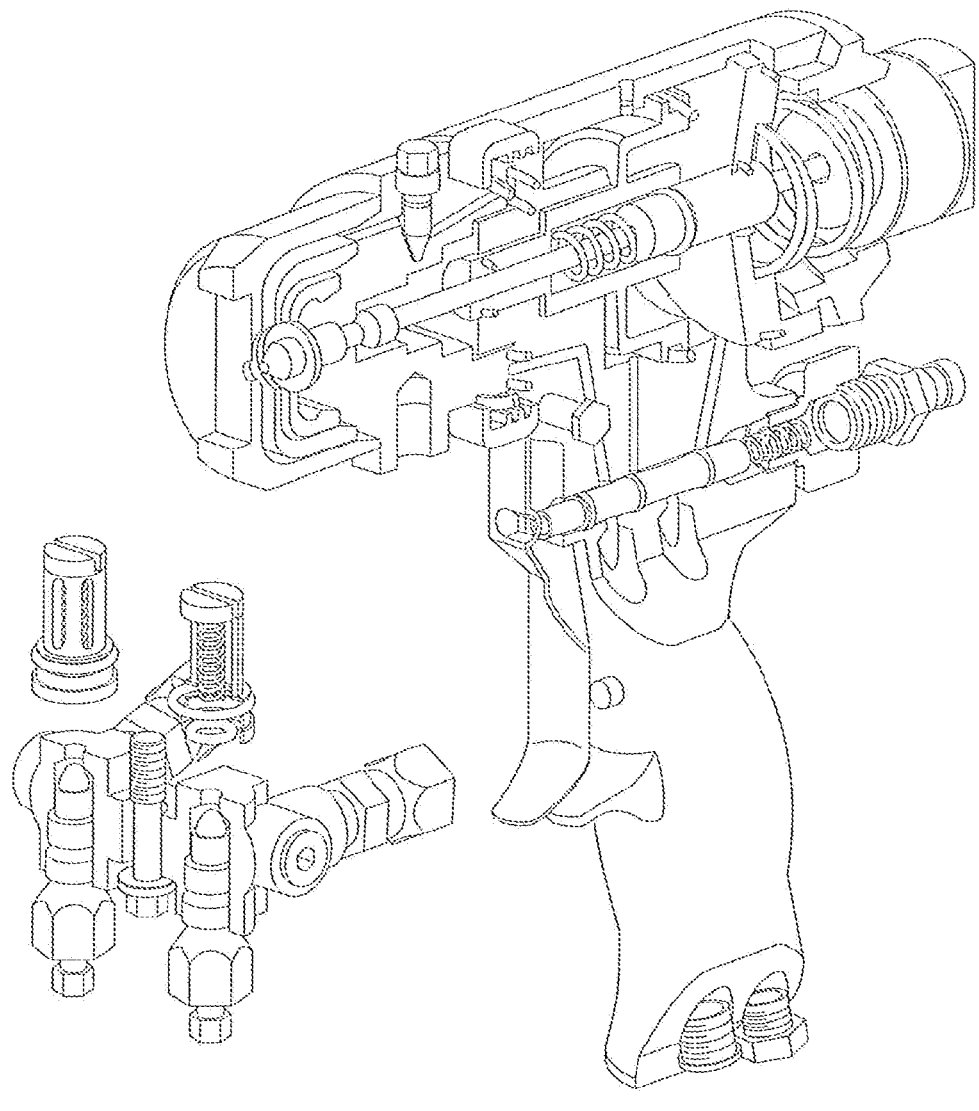
FIG. 17 is a partially cutaway view of the mechanical purge embodiment of FIG. 8.

Mechanical Purge gun operators often must actuate the gun safety, when adjusting air flow or changing tips. The safety 158 must operate easily under all conditions. The guns are often covered with overspray from foam or polyurea, making safety actuation difficult. The safety sleeve 156, made of polyethylene, ensures the safety 158 will be free moving even when covered in overspray and is shown in FIGS. 15 and 16. Foam or polyurea will not stick to polyethylene. If there is a build-up on the safety actuator 160, the polyethylene will shed the over-spray when the safety 158 is actuated.

It is contemplated that various changes and modifications may be made to the spray gun without departing from the spirit and scope of the invention as defined by the following claims.

The invention claimed is:

1. A spray gun for fast setting plural component materials, said spray gun comprising:
    a gun body;
    an air cap;
    a retaining ring;
    a fluid housing removably attached to said gun body, said fluid housing having a threaded surface for threadedly receiving said retaining ring and generally opposed first and second radial ports in said threaded surface; and
    first and second seal cartridges retained in said ports by friction and said retaining ring.

2. The spray gun of claim 1 wherein said air valve engages said gun body with no more than three seals.

3. The spray gun of claim 1 wherein said air valve is connected to a muffler in said gun body.

4. The spray gun of claim 1 further comprising a fluid manifold removably fastened to said fluid housing, said fluid manifold being sealed thereto by an o-ring.

5. The spray gun of claim 1 further comprising a fluid manifold, said fluid manifold comprising a body and first and second fluid valves for connection to first and second components of a plural component material, each of said first and second valves comprising
    a one piece stem having a head thereon to allow manipulation to open or closed positions; and
    a seal for sealingly engaging said manifold body.

6. The spray gun of claim 1 further comprising:
    a mix chamber located in said fluid housing;
    a purge air passage located in said fluid housing;
    a zerk fitting in said fluid housing and connected to said purge air passage for receiving protective material.

7. The spray gun for fast setting plural component materials of claim 1 further comprising a fluid housing having a mix chamber located therein and said first and second seal cartridges sealing against said mix chamber, said cartridges and said mix chamber comprising sealing surfaces comprised of a hardened material.

8. The spray gun for fast setting plural component materials of claim 7 wherein said mix chamber is formed from a hardened material.

9. The spray gun for fast setting plural component materials of claim 8 wherein said hardened material is 440C stainless steel.

10. The spray gun for fast setting plural component materials of claim 1 further comprising a grease fitting in said fluid housing for injection of grease into said spray gun for storage.

11. A spray gun for fast setting plural component materials, said spray gun comprising:

a gun body;

an air cap;

a fluid housing attached to said gun housing and receiving said air cap and generally a mix chamber located in said fluid housing;

a purge air passage located in said fluid housing; and a zerk fitting in said fluid housing and connected to said purge air passage for receiving protective material.

\* \* \* \* \*

UNITED STATES PATENT AND TRADEMARK OFFICE
CERTIFICATE OF CORRECTION

PATENT NO. : 7,694,893 B2 Page 1 of 1
APPLICATION NO. : 10/532436
DATED : April 13, 2010
INVENTOR(S) : Douglas P. Zittel et al.

It is certified that error appears in the above-identified patent and that said Letters Patent is hereby corrected as shown below:

Title page, item [75] inventor: should read -- Mark C. Richter -- (not Richler)

Signed and Sealed this

Twenty-fifth Day of May, 2010

David J. Kappos
*Director of the United States Patent and Trademark Office*